(12) United States Patent
Narayan et al.

(10) Patent No.: US 9,000,103 B2
(45) Date of Patent: Apr. 7, 2015

(54) INTERPENETRATING POLYMER NETWORKS DERIVED FROM SILYLATED TRIGLYCERIDE OILS AND POLYSILOXANES

(71) Applicants: Ramani Narayan, Okemos, MI (US); Daniel Gravier, Midland, MI (US); Sudhanwa Dewasthale, Lansing, MI (US); Elodie Halbot, Lansing, MI (US)

(72) Inventors: Ramani Narayan, Okemos, MI (US); Daniel Gravier, Midland, MI (US); Sudhanwa Dewasthale, Lansing, MI (US); Elodie Halbot, Lansing, MI (US)

(*) Notice: Subject to any disclaimer, the term of this patent is extended or adjusted under 35 U.S.C. 154(b) by 0 days.

(21) Appl. No.: 13/965,495

(22) Filed: Aug. 13, 2013

(65) Prior Publication Data
US 2014/0194567 A1    Jul. 10, 2014

Related U.S. Application Data

(60) Provisional application No. 61/683,946, filed on Aug. 16, 2012.

(51) Int. Cl.
| | | |
|---|---|---|
| C08L 83/04 | (2006.01) | |
| C08G 77/38 | (2006.01) | |
| C08K 3/36 | (2006.01) | |
| C08J 3/24 | (2006.01) | |
| C08K 3/40 | (2006.01) | |
| C08K 7/14 | (2006.01) | |

(52) U.S. Cl.
CPC .. *C08G 77/38* (2013.01); *C08K 3/36* (2013.01); *C08J 3/246* (2013.01); *C08K 3/40* (2013.01); *C08K 7/14* (2013.01); *C08J 2383/04* (2013.01); *C08J 2391/00* (2013.01)

(58) Field of Classification Search
None
See application file for complete search history.

(56) References Cited

U.S. PATENT DOCUMENTS 5,807,922 A * 9/1998 Thames et al. ............... 524/725

FOREIGN PATENT DOCUMENTS

| JP | 10-182671 | * | 7/1998 |
| JP | 2009-227964 | * | 10/2009 |

* cited by examiner

*Primary Examiner* — Marc Zimmer

(57) ABSTRACT

A composition of matter comprising an interpenetrating polymer network of a combination of a silanol-containing polysiloxane phase and a silylated triglyceride oil phase. The two phases are mixed and covalently bound to each other via siloxane crosslinks. A method for producing interpenetrating polymer networks. The method comprises providing triglycerides from oils or fats and reacting the triglycerides with a reactive silane to form a silylated triglyceride oil. The silylated triglyceride oil and a silanol terminated polysiloxane are emulsified with water in a predetermined ratio. Thereafter, crosslinking agents are added and the water is removed from the emulsions providing siloxane crosslinks between the two intimately mixed immiscible phases.

23 Claims, 14 Drawing Sheets

INTERPENETRATING POLYMER NETWORKS DERIVED FROM SILYLATED TRIGLYCERIDE OILS AND POLYSILOXANES

This application claims priority from U.S. Provisional application Ser. No. 61/683,946, filed Aug. 16, 2012.

BACKGROUND OF THE INVENTION

Simple blending of triglycerides into polymeric systems is known but the blends are limited as to their use as plasticizers or stabilizers. A more useful approach is to combine the triglycerides with the polymer as an interpenetrating polymer network as disclosed and claimed herein.

By definition, as interpenetrating network (IPN) is a material containing two or more polymers that have been vulcanized (crosslinked) in the presence of each other to form entangled networks with each other. It was discovered that the morphology of such intimate entanglement of two, or more, immiscible polymeric networks can lead to interesting physical properties that cannot be achieved by grafting, blending or other mixing techniques. Currently, products derived from IPN find applications ranging from false teeth to ion exchange resins, adhesives, high impact plastics, thermoplastics, vibration damping materials for outdoor, aircraft and machinery applications, high temperature alloys and medical devices.

Several IPNs are described in the literature containing plant oils and synthetic polymers. For example, alkyds and polyurethane IPNs (uralkyds) were prepared by casting films from hydrocarbon solutions followed Athawale, v.; Raut, s., Eur. Polym. J. 2002, 38, 2033-2040 and Raut, s.; Athawale, v., J. Polym. Sci., Part A: Polym. Chem. 1999, 37, (23), 4302-4308.) The resulting IPNs were useful as tough coatings and displayed high abrasion and chemical resistance.

Similarly, IPNs of alkyds and methacrylate polymers were described and the combination of the soft and the flexible poly(butyl methacrylate) with the hard and brittle alkyd produced a resin that had better physical properties than each individual component. (Athawale, V.; Raut, S., Poly. Int. 2001, 50, 1234-1240).

IPNs of castor oil triglycerides with poly(ethylene terephthalate) (PET) that were prepared by either ester-ester or ester-hydroxyl interchange reactions exhibited a high degree of toughness and faster crystallization rates than PET alone.

Barrett, L. W.; Sperling, L. H.; Gilmer, J. W.; Mylonakis, S. G., Semi-interpenetrating Polymer Networks Composed of Poly(ethylene terephthalate) and Castor Oil. In Interpenetrating Polymer Networks, American Chemical Society; 1994 Vol. 239, pp 489-516.)

IPNs prepared from castor oil based polyurethanes and styrene monomers were reported to be tough elastomers or reinforced plastics, depending on their composition while IPNs based on castor oil with acrylics were elastomers and exhibited good mechanical properties.

Many other IPNs have also been prepared from functionalized triglycerides of veronia, lesquerella, crambe, and linseed as well as their epoxidized derivatives with polystyrene and polyacrylics.

A recent comprehensive review of various IPNs of natural oils of synthetic polymers is also available at Sharma, V. Kundu, P. P., Prog. Polym. Sci., 2008, 33, (12), 1199-1215.

Most of the previous IPN work with triglycerides involved preparing homogeneous solutions of the triglycerides and the monomer and then polymerizing and crosslinking as phase separation occurs. Thus, the morphology of the resulting IPN was a function of the kinetics of the phase separation.

There are numerous IPNs containing polydimethylsiloxanes with a variety of synthetic polymers showing microphase separation and multi-phase structures due to the inherent immiscibility of polydimethysiloxanes with most organic polymers. Many of these IPNs have interesting and useful properties due to the high chain flexibility, low surface tension, high thermal stability and low $T_g$ of the siloxane chain. Although there is a large number of silicone containing IPNs, no IPNs of silicone polymers and triglyceride oils are described or shown in the literature.

Instead of using organic solvents or relying on the solubility of the monomer in the triglycerides, it is also possible to prepare mixed oil in water emulsions of immiscible components and crosslink them before casting films. This method is known as Latex IPN. It consists of blending together two emulsions composed of components A and B, then crosslinking each independently with suitable crosslinkers.

Alternatively, latex A is crosslinked then another monomer B together with a crosslink agent and an initiator is added and polymerized. These latex IPNs combine both networks in a single latex particle and, as such, the IPN morphology is limited to the size of the latex particles while suspended in emulsion state. The effect of the addition sequence and polymer composition on inter- and the intra-particle micro-domains morphology (core/shell structures), as well as bicontinuous IPN structure inside the particle were reviewed.

In the instant invention, the focus is on Latex blended IPNs where two emulsions of incompatible polymers are prepared separately in one embodiment, and then combined together with a crosslink agent. Provided a common functional group is available on both polymers for crosslinking, the particles from both emulsions undergo intra-particle crosslinks while stills suspended in the water phase. Upon casting, additional inter-particle crosslinks take place between the coagulating particles to yield typical IPN morphology resins whereby the two phases are intimately mixed and crosslinked. Such IPN resins composed of plant oils and silicone could be useful as high release liners, law friction materials or as convenient one-package protective coatings.

THE INVENTION

What is disclosed and claimed herein is a composition of matter comprising an interpenetrating polymer network of a combination of a silanol-containing polysiloxane phase and a silylated triglyceride oil phase. The two phases are mixed and covalently bound to each other.

In another embodiment, there is a method for producing interpenetrating polymer networks, the interpenetrating polymer networks as set forth just Supra.

The method comprises providing triglycerides from oils or fats and reacting the triglycerides with a reactive silane to form a silylated triglyceride oil.

The silylated triglyceride oil and a silanol terminated polysiloxane oligomer are emulsified with water in a predetermined ratio and the siloxane oligomers are allowed to polymerize. Thereafter, a crosslinking agent is added and the water is removed from the emulsions, whereby an interpenetrating polymer network is formed via silanol condensation.

DETAILED DESCRIPTION OF THE INVENTION

Figure 1:
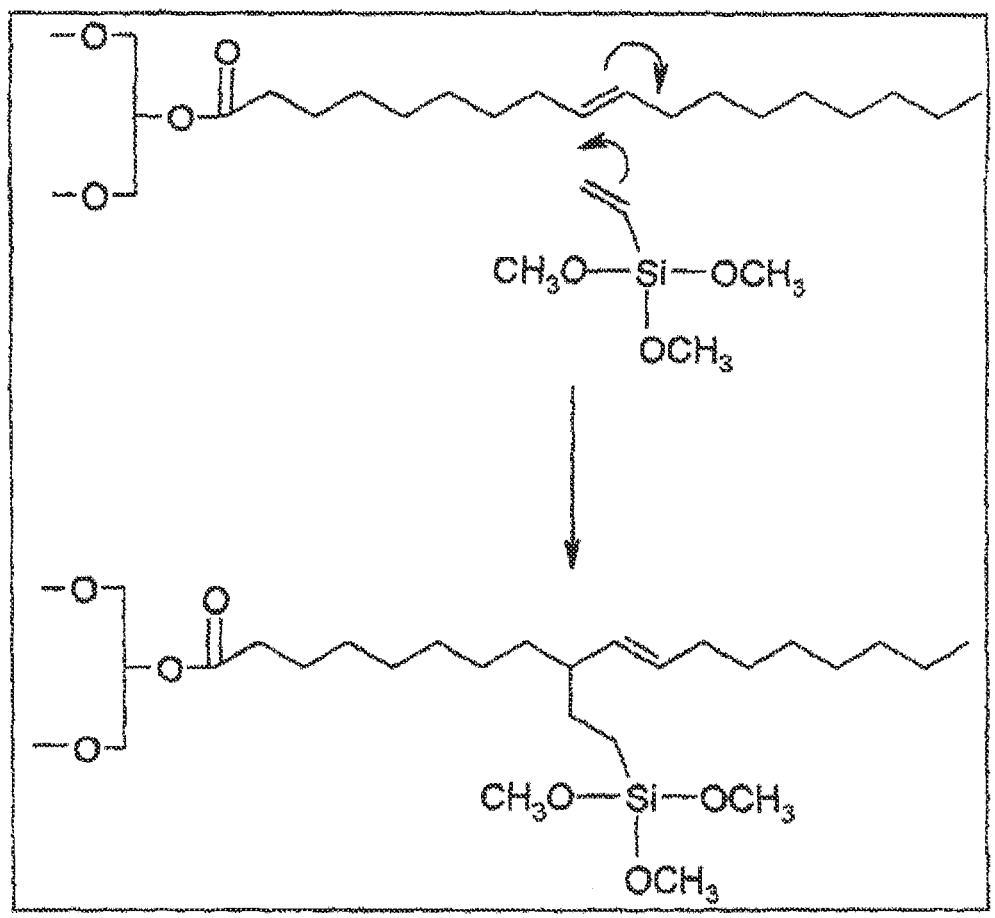
FIG. 1 is a schematic illustration of the silylation of soybean oil by the "ene" reaction.

The polysiloxanes useful in this invention are silanol and silyl ester-containing polymers, for example, polydimethylsiloxanes, polymethylphenylpolysiloxanes, fluorosilicone rubbers, silicone esters, vinyl-functionalized polysiloxanes, partially fluorinated polysiloxanes, and fully fluorinated polysiloxanes.

The triglyceride oils are any vegetable or animal fats containing unsaturated fatty acids. The method incorporates the preparation of silylated triglyceride oils obtained by the reaction of reactive silanes with unsaturated sites of fatty acids comprising triglyceride molecules.

Such silanes useful in this invention are Vinyltrialkoxy silanes, allyltrialkoxysilanes, vinylmethyldialkoxysilanes, and vinyldimethyl-alkoxysilanes. Specifically, such silanes can be, for example, vinyl-trimethoxysilane, vinyltriethoxysilane, allyltrimethoxysilane, allyltriethoxysilane, vinylmethyldimethoxysilane, vinylmethyldiethoxysilane, vinyldimethylmethoxysilane and vinyldimethylethoxysilane.

Useful triglycerides are from oils such as vegetable oil triglycerides, algae oil triglycerides, fish oil triglycerides and animal fat triglycerides, among others.

For purposes of this invention, the ratio of the silylated oils to the polysiloxanes is between 1 weight percent to 99 weight percent.

A preferred ratio is between 10 weight percent to 90 weight percent, and a most preferred ratio is between 30 weight percent to 50 weight percent.

It is contemplated within the scope of this invention to use fillers. The fillers can be, for example, particles or fibers. The fillers can be selected from mineral fillers, organic fillers wherein the organic fillers can be further selected from silica, metal, metal oxides, and mixed metal oxides, and glass fillers such as glass fibers and glass beads.

Adjuvants useful in this invention are, for example, viscosity modifiers, adhesion promoters, process and plasticizing oils, antioxidants, and pigments.

In use, the handling of the emulsions can be by a method selected from the group consisting of brushing, spraying, dip coating, and casting.

The waterless, or dried, cured films formed by the removal of the water from the emulsion provides films having a thickness in the range of 2 to 1000 micrometers. The emulsions are useful for architectural coatings, protective coatings, semipermeable coatings, and stain resistant coatings, and the like.

The physical properties of the desired film can be predetermined based on the selection of the type of polysiloxane polymer, the type of silylated oil, the ratio of the silylated oil to polysiloxane in the composition, and the extent of the crosslink density.

It is contemplated within the scope of this invention to use reinforcing additives in the emulsion prior to removing the water.

Crosslinking agents and curative agents for polysiloxanes are well-known in the art and need not be detailed herein.

EXAMPLES

LowSat® soybean oil was supplied by Zeeland Farm Services, Zeeland, Mich. Silanol terminated polydimethylsiloxane oligomers of 25 cSt viscosity and vinyl trimethoxysilane (VTMS) were purchased from Gelest Inc. 4-Dodecylbenzene sulfonic acid (DBSA), dibutyltin dilaurate (DBTDL) sodium dodecyl sulfate (SDL) and 2,5-Bis(tert-butylperoxy)-2,5-dimethylhexane (Luperox® 101) peroxide, were purchased from Sigma-Aldrich St. Louis, Mo. Colloidal Silica (NALCO-1115) 15 wt. % solids having particle size 4 nm was supplied by Nalco Co.

$^1$H-NMR spectra were recorded on a 500 MHz NMR-spectrometer (Varian Inc., USA, Unity Plus 500 MHz), using the solvent peak as an internal standard.

Thermogravimetric Analyses (TGA 500 from TA instruments) were obtained by heating samples (approximately 8.5 mg) from room temperature (RT) to 500° C. at 10° C./min under a nitrogen atmosphere.

Differential scanning calorimetry (Q2000 DSC from TA instruments) data were obtained by first heating a sample (approximately 6 mg) under a nitrogen atmosphere to 200° C. to erase any thermal history, then cooling to −70° C. at 10° C./min followed by heating to 200° C. at 10° C./min.

The extent of cross-linking was determined by measuring the gel and swell ratios of cast films after ensuring all the water was evaporated using toluene as a solvent as described in ASTM method D2765-11.

The mechanical properties (stress-strain) were measured at room temperature using a Universal Testing Machine (SFM-20) according to ASTM D638[32]. The tensile tests were pulled at 6 cm/min and in all cases at least 5 specimens of each sample were tested and the average value was recorded. Scanning electron microscope (SEM, Hitachi S-4700, Japan) was used to study the morphology of fractured surfaces. A fresh surface was obtained by fracturing the specimen in liquid nitrogen.

Silylated Soy Oil Emulsion.

LowSat® soybean oil (600 gr), VTMS (306 gr) and Luperox® L101 (1 wt. %) were mixed and added to a 2 L Parr reactor (Parr Instrument Company). The reactor was purged with nitrogen to remove oxygen and maintain an inert atmosphere, then heated to 280° C. for 12 hours to graft the VTMS onto the soybean oil by the Ene reaction as shown in FIG. 1. The structure of the silylated soy oil (Soy-VTMS) thus obtained was confirmed by $^1$H-NMR as follows:
Soybean oil: $^1$H-NMR (500 Hz, CDCl$_3$, δ in ppm): 5.32 (m, —CH=CH—); 5.24 (m, —O—CH(—CH$_2$O—)—CH$_2$O); 4.25 and 4.14 (d, —O—CH(—CH$_2$O—)—CH$_2$O—); 2.74 (t, —CH=CH—CH$_2$—CH=CH—); 2.28 (t, —CH$_2$—C(O)O—); 2.03 (m, —CH=CH—CH$_2$—CH$_2$—); 1.58 (m, —CH$_2$—CH$_2$—C(O)O—); 1.27 (m, —CH$_2$—CH$_2$—CH$_2$—), 0.95 and 0.89 (t, —CH$_3$) VTMS: $^1$H-NMR (500 Hz, CDCl$_3$, δ in ppm): 6.15, 6.00 and 5.85 (d, CH$_2$=CH—Si—); 3.58 (s, —Si—(OCH$_3$)$_3$) Soy-VTMS: $^1$H-NMR (500 Hz, CDCl$_3$, δ in ppm); (500 Hz, CDCl$_3$; δ in ppm): 6.2-5.8 (CH$_2$=CH—Si—); 1.57 (—CH$_2$—)—CH—(—CH$_2$—); 1.27 (t Si—CH$_2$—CH$_2$—); 0.63 ((t Si—CH$_2$—CH$_2$—); 3.64-3.58 (s, —Si—(OCH$_3$)$_3$); 5.33 (m, —CH=CH—); 5.28 (m, O—CH(—CH$_2$O—)—CH$_2$O); 4.14 and 4.04 (d, —O—CH(—CH$_2$O—)—CH$_2$O—); 2.74 (t, —CH=CH—CH$_2$—CH=CH—); 2.28 (t, —CH$_2$—C(O)O—); 2.01 (m, —CH=CH—CH$_2$—CH$_2$—); 1.60 (m, —CH$_2$—CH$_2$—C(O)O—); 1.28 (m, —CH$_2$—CH$_2$—CH$_2$—), 0.94 and 0.87 (t, —CH$_3$).

The silylated soy oil (900 grams) was homogenized with SDS (22.5 grams) in a Manton-Gaulin laboratory homogenizer (model No. 15MR APV-SPX) at 53 MPa to yield 45% solids in the emulsion. Two passes through the homogenizer under these conditions yielded a stable emulsion with an average particle size of 0.1-0.3 μm.

Upon aging, the hydrolytically unstable methoxysilanes are hydrolyzed to form silanol functional groups on the soy triglycerides.

Emulsion Polymerization of Polydimethylsiloxane.

The preparation of high molecular weight PDMS in emulsions is well known. A stable emulsion was prepared by homogenizing 500 g of low molecular weight, silanol terminated polydimethylsiloxane oligomers (400-700 g/mol), 500 g distilled water and 12.5 g DBSA in a Manton-Gaulin laboratory homogenizer at 53 MPa. Two passes through the homogenizer under these conditions yielded a stable emulsion with an average particle size of 0.2-0.4 μm. This silicone emulsion was allowed to polymerize at room temperature for 96 h. At the end of this period the molecular weight was Mn=66,000 g/mol and Mw=92,000 g/mol. The pH was then adjusted to ~10 with KOH and colloidal silica (20 grams) then DBTDL (1.0 grams) were added.

Preparation of Soybean Oil-PDMS IPNs by the Emulsion Method.

Various IPN compositions were prepared simply by mixing different amounts of the PDMS and the silylated soybean oil emulsions (Table 1), then casting films and allowing the water to evaporate at RT. In all cases, the mixed emulsions were stable with no apparent coagulation or creaming. Similarly, no apparent gross phase separation was observed in the cast films after the water was evaporated.

Emulsion Polymerization of PDMS

Figure 2:
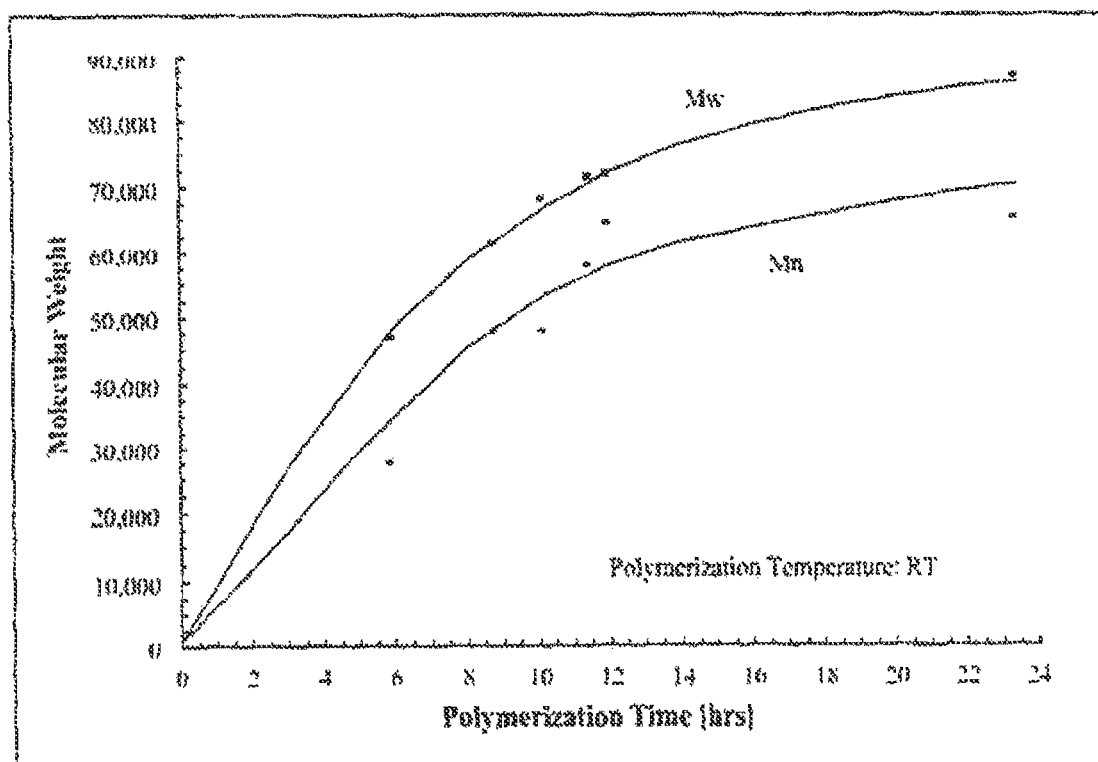
FIG. 2 is a graph of polymerization of polydimethylsiloxane in emulsion.

The progress of the polymerization of PDMS was monitored by sampling the emulsion periodically. Each sample was neutralized with 0.5N KOH, precipitated in methanol then dissolved in toluene and analyzed by GPC. The Mw and Mn as a function of polymerization time are shown in FIG. 2. After 23 hours the polymerization was terminated yielding Mn=66,400 g/mol and Mw=92,400 g/mol.

Silylation of Soybean Oil

Figure 3:
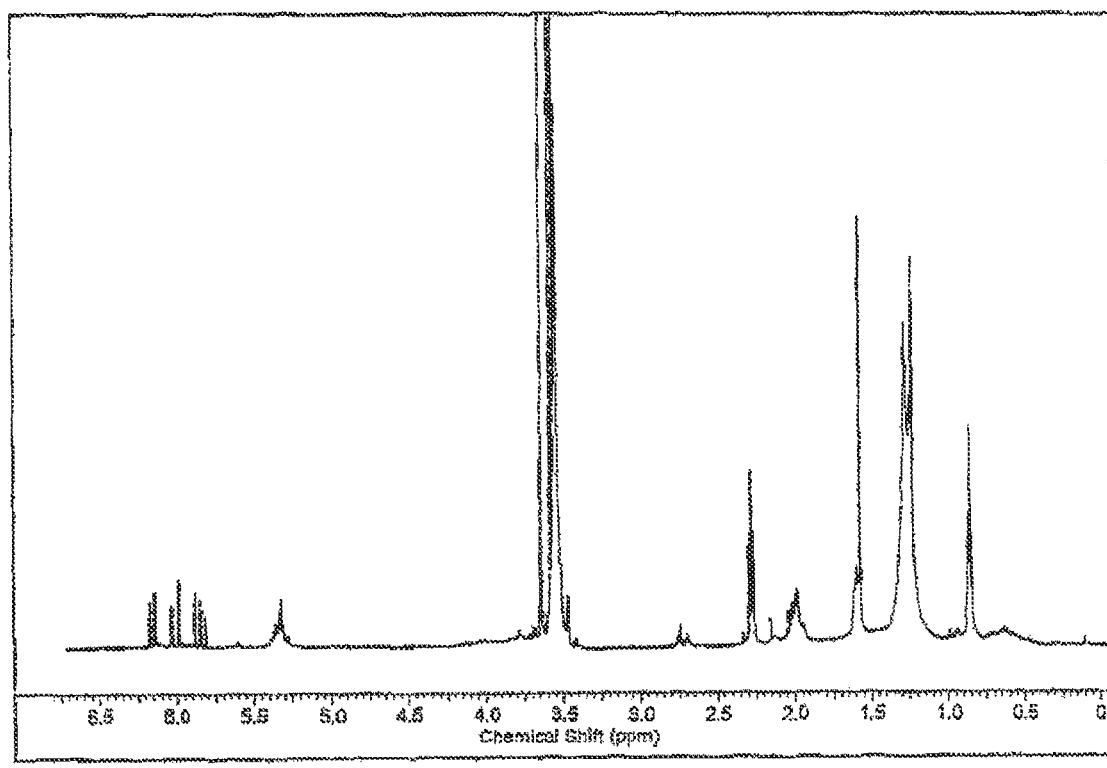
FIG. 3 is a $^1$HNMR of silylated soy oil.
Figure 4:
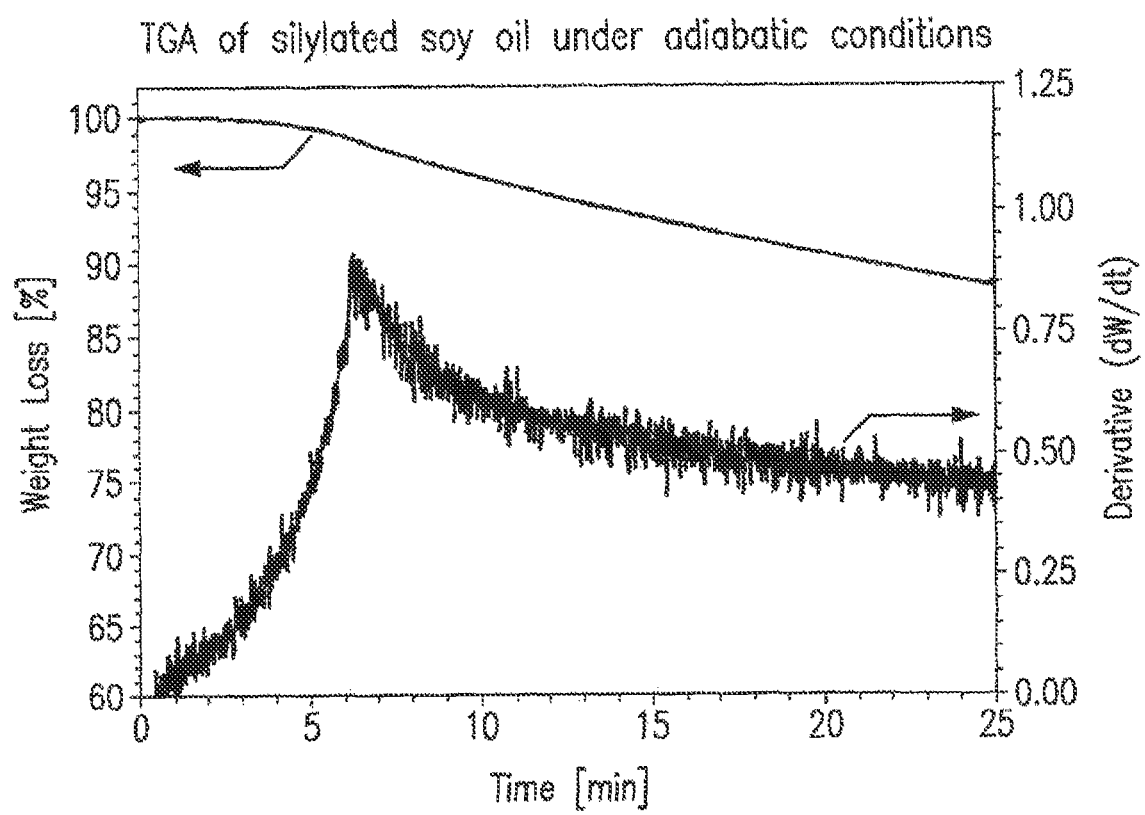
FIG. 4 is a thermographic analysis (TGA) graph of silylated soy oil under adiabatic conditions.

A high degree of grafting of VTMS onto the soy oil was achieved by the "Ene reaction" as observed by $^1$H-NMR (FIG. 3) and TGA (FIG. 4). The presence of methoxysilanes is clearly observed in the $^1$H-NMR at δ=3.54 ppm together with a resonance peak corresponding to the ethylene group next to the silicon atom at δ=1.27 and δ=0.63 ppm. Additionally, a resonance peak δ=1.57 ppm related to the C—H grafting position is also observed. The multiple peaks around 5.8-6.2 ppm related to unreacted vinyl groups of the silane have been largely decreased indicating that small amounts of silane remained unreacted. The extent of grafting can easily be determined by running the TGA in adiabatic mode at 150° C. above the boiling point of VTMS (123° C.). Under these conditions, free (not grafted) VTMS will be evaporated and the yield of the grafting reaction can be determined from the weight loss. It is apparent from the data in FIG. 4 that all unreacted VTMS was removed within 10 minutes at this temperature and this unreacted fraction was less than 3 wt % of the total mass of the sample. By knowing the ratio of VTMS to soy oil, the yield of the grafting is estimated to be 95%.

Although it is possible to remove the unreacted fraction of VTMS by distillation, it was decided to leave it in the system since upon emulsifying the oil the methoxy groups, whether grafted or free, will hydrolyze and the resulting silanols will react to crosslink the oil.

Formation of IPN

The IPN here is obtained in two steps via siloxane crosslinks; in the first step, silicates are introduced via partial dissolution of colloidal silica in the alkaline pH of the mixed emulsion. These monomeric, or possibly dimeric, silicate species are grafted onto the silanol chain-ends of both PDMS and the silylated soy oil. These silanol condensation reactions are catalyzed by DBTDL leading to intra-particle crosslinks.

In a second step, additional inter-particle crosslinks are obtained upon evaporation of the water between the coagulating emulsion particles. These inter-particle crosslinks through additional silanol condensations further contribute to the overall network via condensation reactions between the terminal silanols of the PDMS particles, the silylated soy oil particles, low molecular weight silicates and the silica particles. The small silica particles further act as a reinforcing agent to produce an entangled crosslinked IPN network. The structure of these IPN is represented schematically in FIG. 5.

Figure 5:
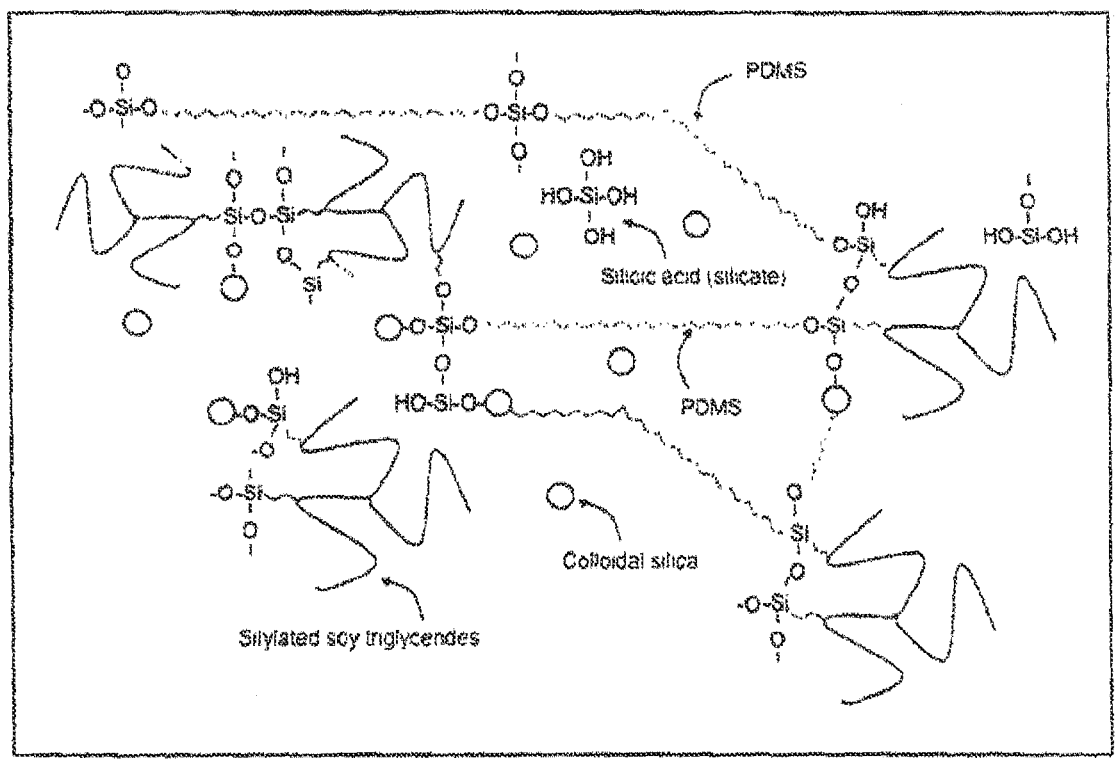
FIG. 5 is a schematic representation of a silylated soy oil/Polydimethylsiloxane interpenetrating network.

It should be noted that stable siloxane linkages are the basis for the crosslinks of the network. Since all components contain terminal silanols, these crosslink linkages connect all components to the network. The possibility of intra-molecular weight reactions (e.g. siloxane linkages between two fatty acids of the same triglyceride) cannot be eliminated although these linkages will not contribute to the network. Furthermore, as depicted in FIG. 5, it is expected that a large concentration of silanols will be present. Consequently, one would expect the coating to have excellent adhesion to inorganic substrates including glass, cement, brick, aluminum, etc.

Morphology

The morphology of the IPNs is greatly affected by the relative concentrations of PDMS and silylated soybean oil as observed in the SEM micrographs (FIG. 6A-D). All four micrographs indicate distinct phase separation that changes with the relative concentration of the silylated soy and PDMS. As the concentration of one component is increased and the other is decreased, dual phase morphology is observed followed by a bicontinuous morphology and then again a dual phase morphology.

Figure 6A:
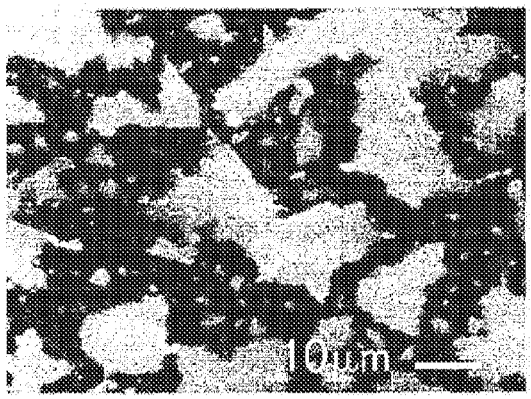
FIG. 6A is an SEM image of an IPN having a ratio of soybean oil to polydimethylsiloxane of 20:80.
Figure 6B:
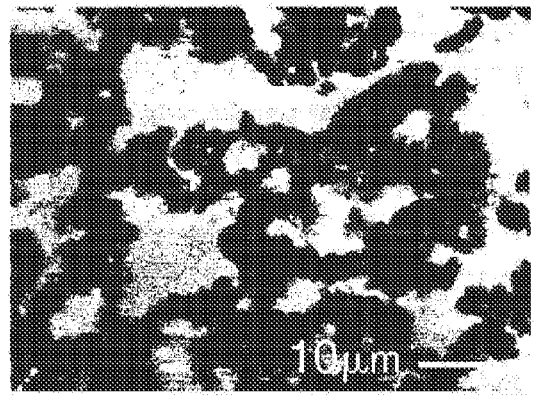
FIG. 6B is an SEM image of an IPN having a ratio of soybean oil to polydimethylsiloxane of 40:60.
Figure 6C:
FIG. 6C is an SEM image of an IPN having a ratio of soybean oil to polydimethylsiloxane of 60:40.
Figure 6D:
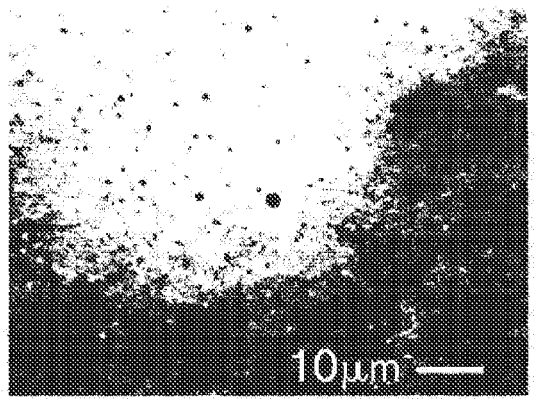
FIG. 6D is an SEM image of an IPN having a ratio of soybean oil to polydimethylsiloxane of 80:20.

Thus, the IPN containing 20 wt % silylated soy (FIG. 6A) shows the PDMS-rich phase as the continuous matrix with the silylated soy phase dispersed in it as fine globular nodules, about 1-3 μm in size. Further increasing the concentration of the silylated soy to 40 or 60 wt. % (such that it is present at about the same concentration as PDMS) leads to a co-continuous morphology (FIGS. 6B and C). The globular nature of the domains is still visible but the continuous phase is less distinct giving rise to the appearance that all the globular domains are stuck to each other. Further increasing the concentration of the silylated soy component to 80 wt. % (FIG. 6D) leads again to dual phase morphology.

However, here the continuous phase is the soy matrix and the dispersed phase consists of globular PDMS domains about 0.5-2 µm. Similar changes in the dual phase morphology were noted before where component 1 of the IPN is dispersed in component 2 at low concentration but it then becomes the continuous phase at high concentration and component 2 is found as the dispersed phase.

The presence of phase separation and globular domain structures are influenced primarily by the extent of the miscibility between the soy matrix and PDMS. However, in this case the shape of the domains is also determined by the intra-molecular crosslinks that were induced in the emulsion phase in both particles. These crosslinks in each phase prevent unrestricted flow upon coagulation and film formation and restrict the structures of the domains. Since the crosslink density of each component need not be the same, it is expected that these variations in the morphology will have significant effects on the mechanical properties.

It is also important to note that no cracks, voids or other defects are observed along the interface between these globular domains and the matrix indicating a strong cohesion between the two phases in these IPNs.

Thermal Properties

Figure 7:
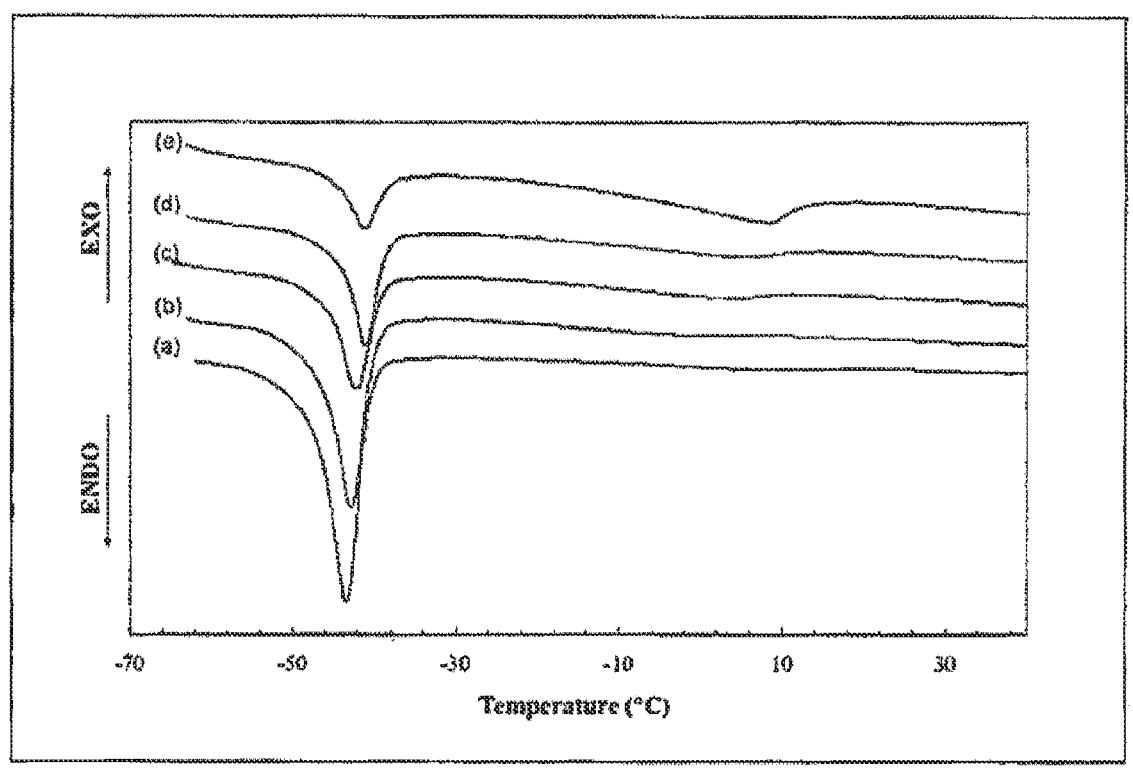
FIG. 7 is a DSC of IPNs with various concentrations of silylated soy to polydimethylsiloxane wherein (a) is a ratio of 0:100; (b) is a ratio of 20:80; (c) is a ratio of 40:60; (d) is a ratio of 60:40; (e) is a ratio of 80:20 and (f) is a ratio of 100:0.

The thermal properties of the cast IPN films were investigated by DSC (FIG. 7). The melting temperature of PDMS ($T_{m1}$) was observed at −43° C. and slightly increased as the concentration of the silylated soy oil was increased. The enthalpy of this melting transition was inversely proportional to the concentration of the silylated oil and decreased from 16.53 J/g for PDMS to 3.18 J/g for the sample composed of only 20% PDMS, respectively (Table 1). This increase in the melting point and decrease of the enthalpy indicate a lower organization of the PDMS chains due to the formation of the network.

Similarly, a small but noticeable melting temperature ($T_{m2}$) was observed related to the saturated fatty acids of the soy oil triglycerides, which was not affected by the composition of the IPN although the enthalpy of this melting transition was directly proportional to the concentration of the soy in the IPN.

Apparently, these saturated fatty acids do not participate in the network since the grafting of the silane occurred only onto the unsaturated fatty acids. Consequently, the saturated fatty acids act as "dangling ends" and are free to crystallize. This general phenomenon has been observed previously in various other IPNs where a net decrease in the chains mobility was noted due to close interactions (e.g. physical crosslinks and chain entanglements) between the phases in the micro-domains.

Figure 8:
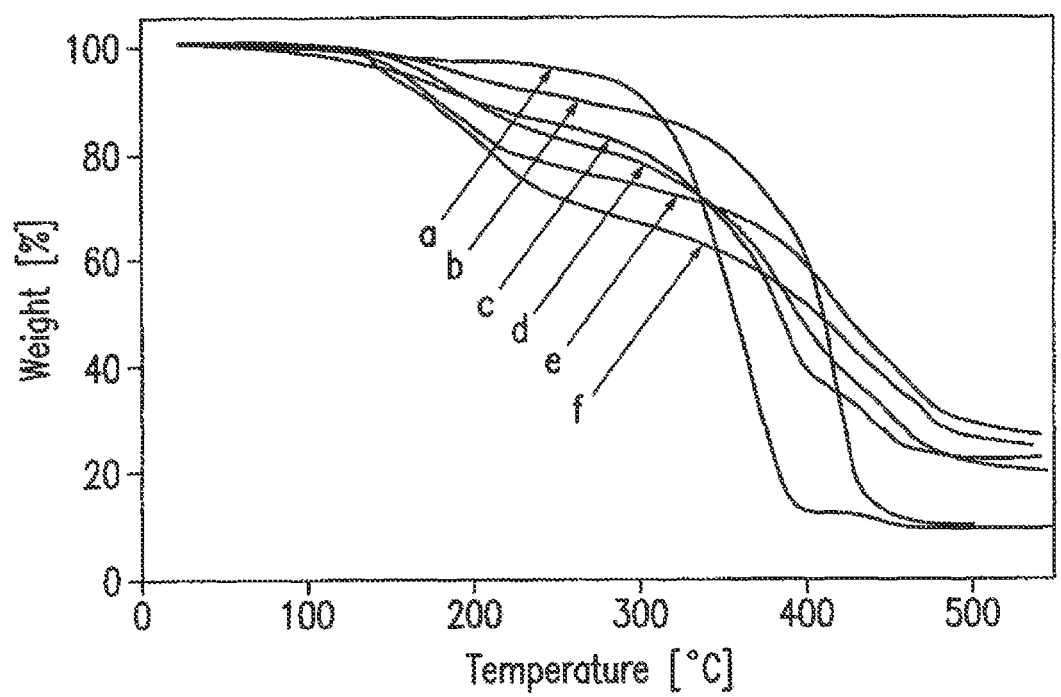
FIG. 8 is a TGA of IPNs with various concentrations of silylated soy/polydimethylsiloxanes wherein (a) is a ratio of 0:100; (b) is a ratio of 20:80; (c) is a ratio of 40:60; (d) is a ratio of 60:40; (e) is a ratio of 80:20 and (f) is a ratio of 100:0.

Since the siloxane linkages are well known for their high bond strength and thermal stability to homolytic cleavage, it was interesting to evaluate the thermal stabilities of the IPNs as a function of the siloxane content. It was surprising to note from the TGA data (FIG. 8) that the onset temperature of degradation of the PDMS network (containing no silylated oil) was only 315° C., much lower than one would expect from crosslinked PDMS rubber.

Apparently, the presence of DBTDL, which is a known reversible condensation catalyst, caused premature degradation via rearrangement of the ring-chain equilibrium. It was also unexpected to note that the silylated soy oil thermogram (FIG. 8, trace F) consists of two degradation modes, the first at 131° C. and the second at 374° C. The higher degradation temperature is a typical degradation temperature of soy oil. Presumably, the lower degradation temperature is related to the presence of the silyl groups grafted onto the fatty acids of the triglycerides. Hydrolysis of the methoxide groups on the silane followed by partial condensation of the resulting silanols leaves some fraction of free silanol groups present in the matrix.

Figure 9:
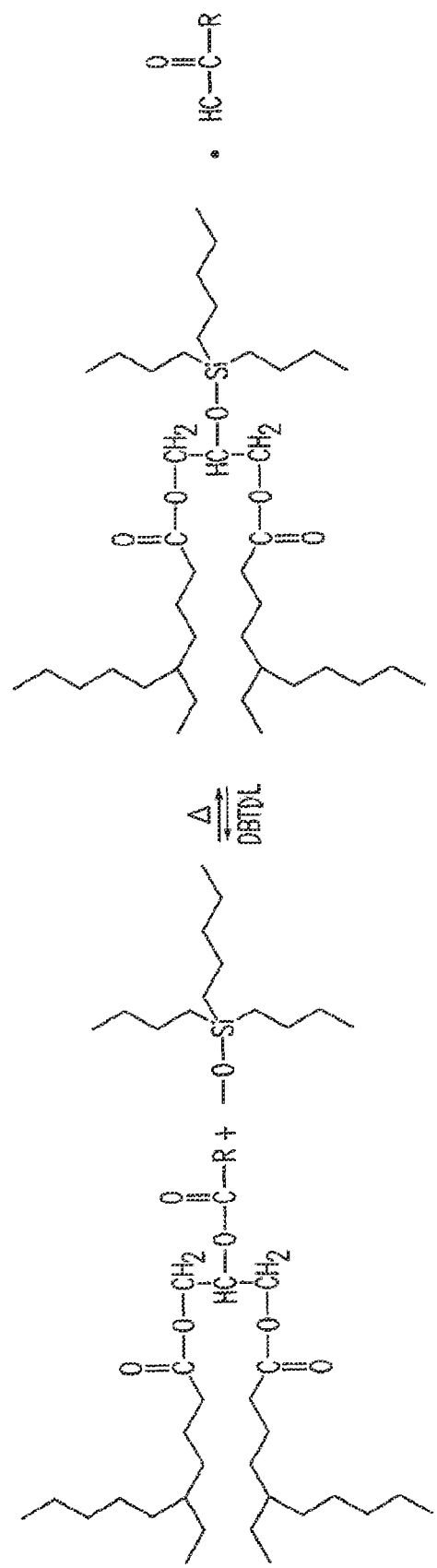
FIG. 9 is a schematic of a trans-esterification of silanol with ester triglycerides.
Figure 10:
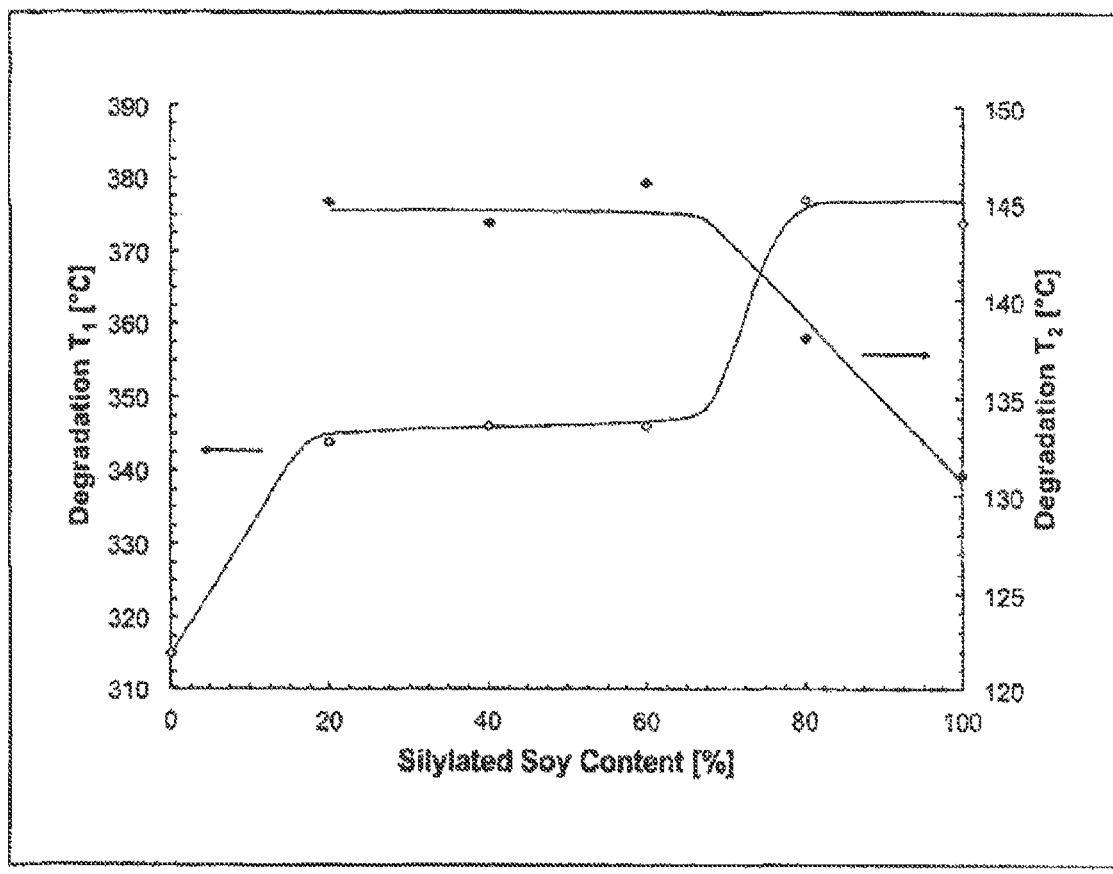
FIG. 10 is TGA decomposition temperatures of different IPN compositions.

Upon heating, a trans-esterification reaction between the ester groups of the triglycerides and free silanol can take place leading to free fatty acids as shown in FIG. 9. Since no grafting took place on the saturated fatty acids, they do not participate in the network and, thus, are most likely responsible for the lower temperature degradation mode. It is important to note that, both the upper and lower degradation temperatures are affected by the composition of the IPN (FIG. 10).

The high temperature mode is directly proportional to the silylated soy oil content in the IPN and increases to a plateau when the silylated soy content was between 20-60 wt. %. At higher concentration it further increased up to 374° C. in a sample that was composed of only silylated soy oil (no PDMS). The lower degradation temperature is essentially constant for IPNs containing between 20-60 wt. % silylated soy oil (around 145° C.) and then decreases to −130° C. for the silylated soy sample (no PDMS).

It is apparent that the degradation of simple blends (no IPN) does not depend on the relative concentration of each component and the degradation temperature of each component is expected to be characteristic of that component. The TGA results indicate that extensive grafting; crosslinking, and interpenetration are responsible for this enhanced thermal stability of the IPNs.

Gel-Swell Analysis

Figure 11:
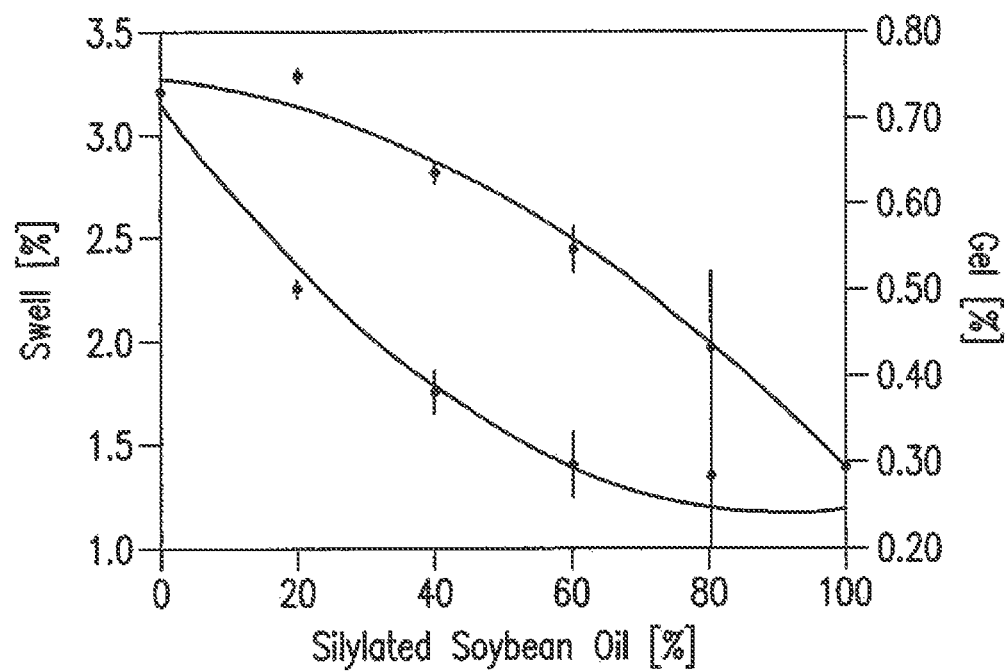
FIG. 11 is a graph of gel and swell fractions of different IPN compositions.

The degree of swell and the gel fraction were measured as a function of composition of the IPNs (FIG. 11). The equilibrium swell ratio (Q) was calculated using equation 1:

$$Q = \frac{W_{P0}/d_P + W_s/d_s}{W_{P0}/d_P} \quad (1)$$

wherein, $W_{P0}$ is the initial weight of the sample, $W_S$ is the weight of the swollen sample at equilibrium, $d_P$ the density of the sample and $d_S$ is the density of the solvent.

The gel fraction (G) was calculated using equation 2:

$$G = \frac{W_P}{W_{P0}} \times 100 \quad (2)$$

wherein, $W_P$ is the weight of the dried sample after all the extractable sol was removed while swelling.

It is apparent that the hompolymer PDMS exhibited fairy high swell and gel while the sample containing crosslinked silylated soy exhibited low gel fraction and relatively low swelling. This combination is highly unusual since high gel fraction usually means high crosslink density and therefore low swelling. Apparently, the network in these IPNs is non-uniform and the silylated soy phase contains a high density of localized crosslinks (e.g. tight network), leading to low swelling of these regions.

However, other regions contain no crosslinks and therefore do not contribute to the gel content. Thus, the data indicate that only about 30 wt. % of the silylated soy sample is crosslinked (70 wt. % is soluble in toluene), but these crosslinked regions contain a relatively high density of crosslinks leading to low swell ratio of these regions. In comparison, the cured PDMS sample (containing no silylated soy) exhibits a fairly high degree of swelling and also a high gel fraction.

Thus, the network in this sample is more uniform and complete, leading to high gel content. However, the overall crosslink density is low resulting in a high degree of swelling. Since the crosslinking mechanism is the same in both components and is based on the formation of siloxane linkages by the condensation of terminal silanols, the gel and swell fractions of each IPN are observed between these two extremes and depend on the composition of the sample. In general, it is observed that the gel content and the swell ratio are inversely proportional to the concentration of the silylated soy content. Conversely, increasing the concentration of PDMS in the IPN leads to a more uniform crosslink structure and a higher gel fraction, but due to the relatively low degree of crosslinking also a higher swell ratio.

It is important to note that although the network is not uniform, both, the silylated soy and the PDMS are participating in the cure. If only one of these phases was cured, semi-IPNs would have been formed where one component is inter-locked (but not covalently linked) to the other component. Obviously, the cure mechanism in this case leads to full IPNs.

Mechanical Properties

Figure 12:
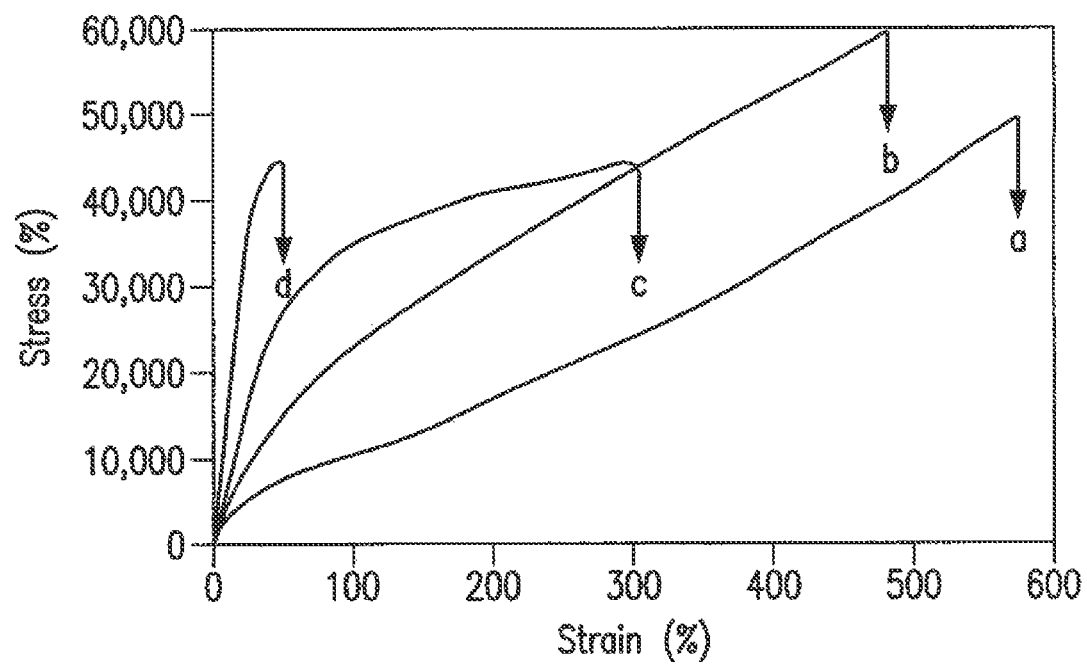
FIG. 12 is a graph of stress-strain curves of IPNs with various concentrations of silylated sol/polydimethysiloxanes wherein (a) is a ratio of 0:100; (b) is a ratio of 20:80; (c) is a ratio of 40:60; (d) is a ratio of 60:40.
Figure 13:
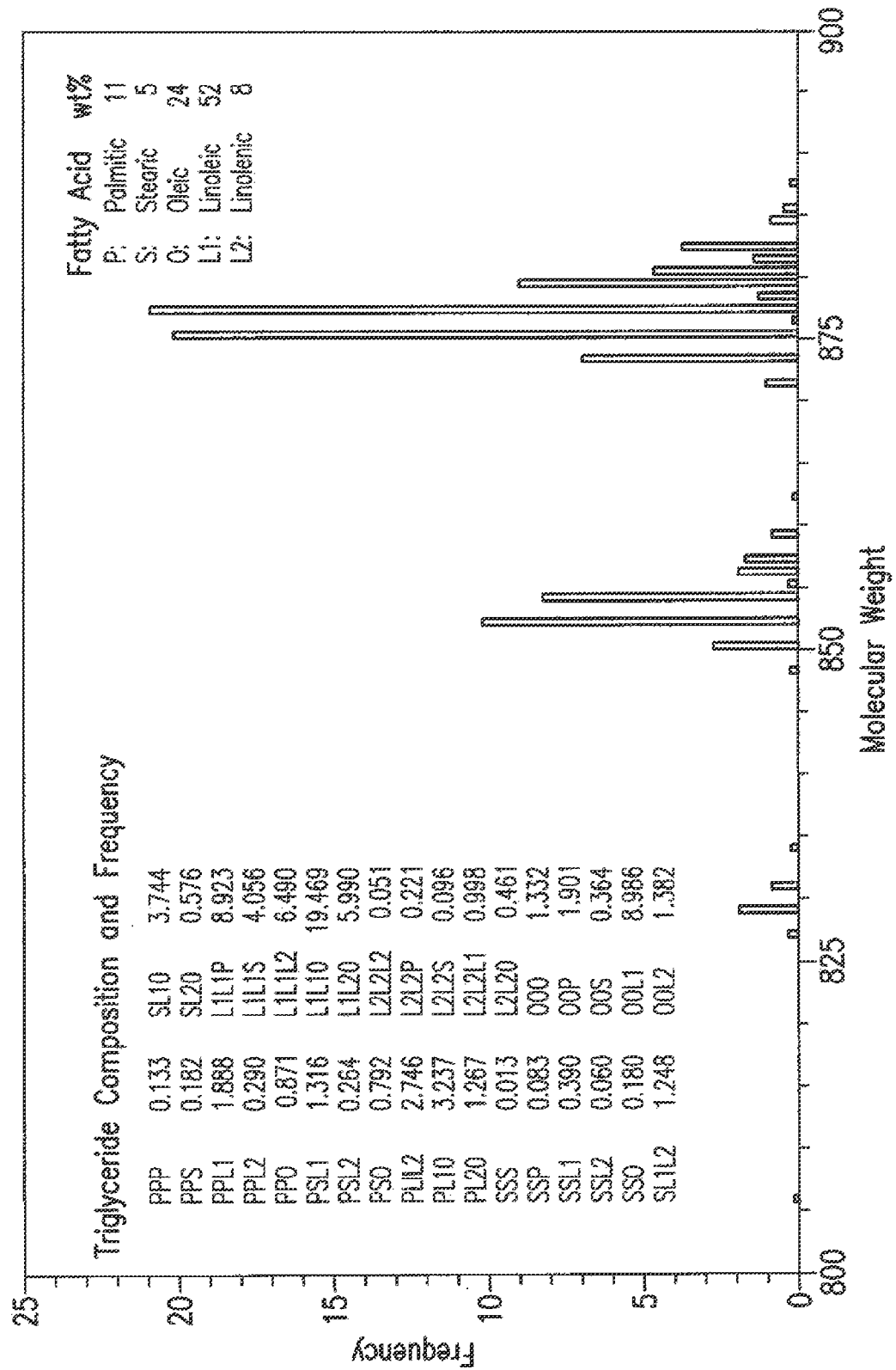
FIG. 13 is a graph of composition and molecular weight of triglyceride compositions.
Figure 14:
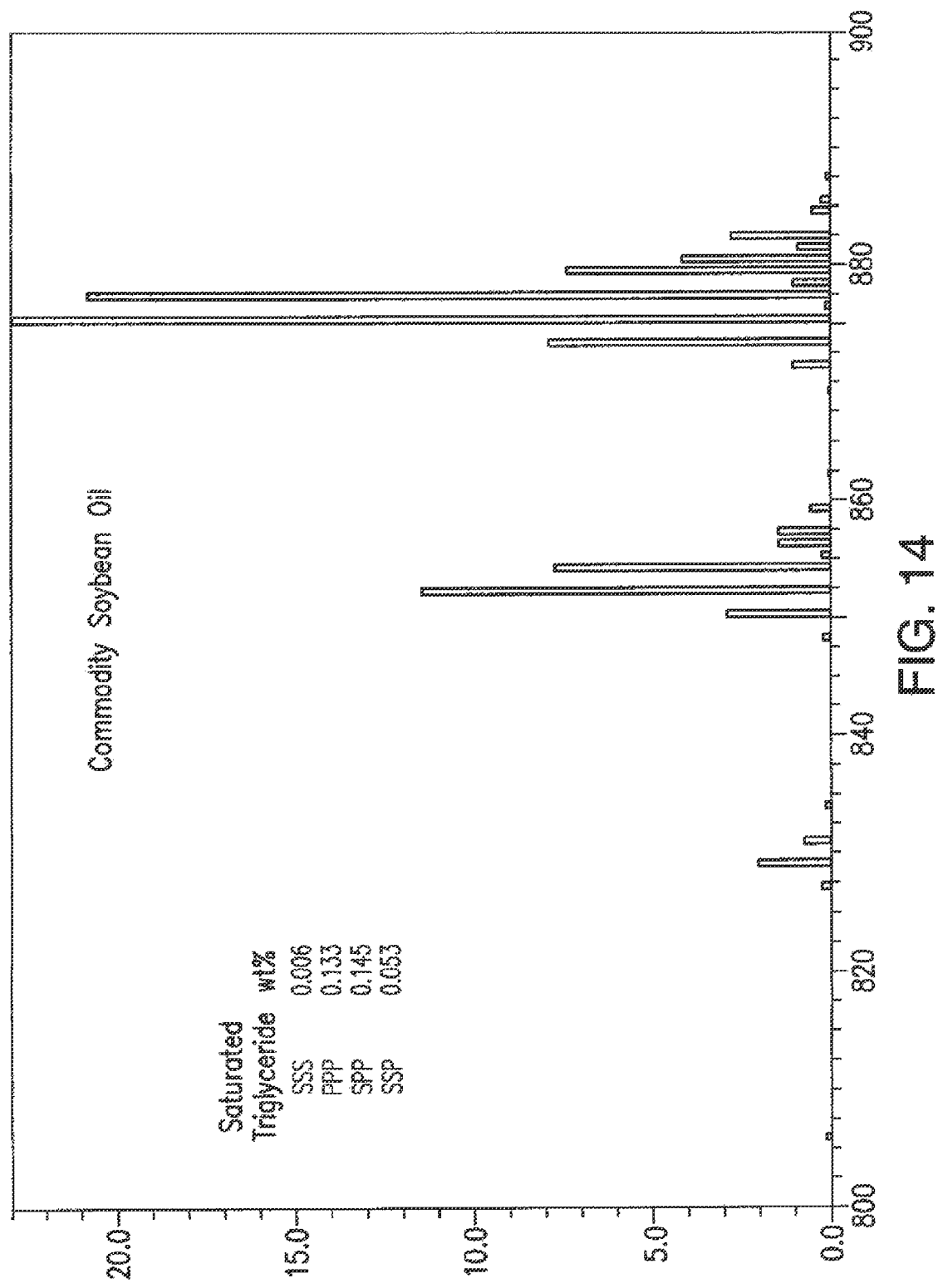
FIG. 14 is a graph of composition and molecular weight of a commodity soybean oil.

The effects of composition on the mechanical properties of the IPNs are shown in FIG. 12 and the main properties are presented in Table 2. As indicated from the gel-swell measurements, the sample containing 80 wt. % silylated soy and the sample composed of only cured silylated soy (no PDMS) had a high degree of crosslinks and were too brittle for accurate tensile testing. The sample composed of cured PDMS (no silylated soy) was found to have similar elastomeric properties to those previously reported in the literature.

The tensile strength and the initial modulus increased as the concentration of the silylated soy fraction in the IPN increased while the elongation at break decreased. These changes are undoubtedly related to the high crosslink density of the silylated soy matrix as described earlier. It is interesting to note that, generally, the elongation at break of semi-IPNs does not decrease drastically as the crosslink density is increased when compared to full IPNs.

This trend is simply due to the fact that the un-crosslinked phase in the semi-IPN acts as a plasticizer or a polymeric filler and exhibits higher mobility compared to full IPNs where the crosslinking of both phases restrict the mobility of the network. In the current silylated soy/PDMS IPNs the elongation at break is drastically reduced as the silylated soy concentration is increased, clearly indicating that this phase is an integral part of the network. Similarly, as the concentration of the soft PDMS phase is decreased, the modulus and the tensile strength of the sample are increased.

It follows from the mechanical properties that the crosslinked soy triglycerides act as a high modulus resin-like component and the lightly crosslinked PDMS as a ductile matrix. Apparently, the relatively low molecular weight of the triglycerides (e.g. roughly 900) containing roughly one silyl group per fatty acid residue leads to a free chain length of ~300 between crosslinks. Furthermore, since each grafted silane contains three silanols and each of these silanols is available to form short disiloxane crosslinks, the distance between crosslinks is very short resulting in a rigid matrix with very low elongation.

The PDMS phase is composed of high molecular weight linear polymers that is well above its Tg and is crosslinked only at the chain-ends leading to matrix that is highly flexible and elastomeric. Thus, useful compositions in this series are IPNs composed of high concentrations of PDMS as the continuous phase leaving the rigid silylated soy as a discontinuous, dispersed phase.

What is claimed is:

1. A composition of matter comprising an interpenetrating polymer network of a combination of a silanol-containing polysiloxane phase and a silylated triglyceride oil phase, wherein the two phases are mixed and covalently bound to each other.

2. A method of for producing interpenetrating polymer networks said interpenetrating polymer networks as claimed in claim 1, said method comprising:
   a. providing triglycerides from oils or fats;
   b. reacting said triglycerides with a reactive silane to form a silylated triglyceride oil;
   c. emulsifying said silylated triglyceride oil and a silanol terminated polysiloxane oligomer with water in a predetermined ratio, and allowing polymerization of said polysiloxane;
   d. adding crosslinking agents;
   e. removing said water from the emulsions, whereby an interpenetrating polymer network is formed.

3. The method as claimed in claim 2 wherein, in addition, there is added reinforcing additives prior to removing said water.

4. The method as claimed in claim 2 wherein said silanol-terminated polysiloxane is selected from the group consisting of:
   a. polydimethylsiloxane; b. polymethylphenylpolysiloxanes, c. fluorosilicone rubber; d. silicone esters, e. vinyl-functionalized polysiloxanes; f. partially fluorinated polysiloxanes, and g. fully fluorinated polysiloxanes.

5. A method of producing silylated triglyceride oils reacting reactive silanes with the unsaturated sites of triglyceride molecules derived from unsaturated fatty acids.

6. A method of producing silylated triglyceride oils as claimed in claim 5 wherein said reactive silanes are selected from the group consisting of vinyltrialkoxysilane, allyltrialkoxysilane, vinylmethyldialkoxysilane, and vinyldimethylalkoxysilane.

7. A method as claimed in claim 6, wherein said reactive silanes are selected from the group consisting of vinyltrimethoxysilane, vinyltriethoxysilane, allyltrimethoxysilane, allyltriethoxysilane, vinylmethyldimethoxysilane, vinylmethyldiethoxysilane, vinyldimethylmethoxysilane and vinyldimethylethoxysilane.

8. A method of producing interpenetrating network polymers as claimed in claim 2, wherein said triglycerides are selected from the group consisting of vegetable oil triglycerides, algae oil triglycerides, fish oil triglycerides and animal fat triglycerides.

9. A method as claimed in claim 2 wherein the ratio of said silylated oils to said polysiloxanes is between 1 weight percent to 99 weight percent.

10. A method as claimed in claim 9 wherein the ratio of said silylated oils to said polysiloxanes is between 10 weight percent to 90 weight percent.

11. A method as claimed in claim 9 wherein the ratio of said silylated oils to said polysiloxanes is between 30 weight percent to 50 weight percent.

12. A method as claimed in claim 2 wherein said polysiloxanes and said silylated triglyceride oils are separately emulsified and then mixed together.

13. A method as claimed in claim 2 wherein there is also present fillers.

14. A method as claimed in claim 13 wherein said fillers are selected from particles or fibers.

15. A method as claimed in claim 14 wherein said fillers are selected from the group consisting of mineral fillers, organic fillers wherein said organic fillers are further selected from silica, metal, metal oxides, and mixed metal oxides.

16. A method as claimed in claim 14 wherein said fillers are selected from the group consisting of glass fibers and glass beads.

17. A method as claimed in claim 2 wherein there is also present adjuvants.

18. A method as claimed in claim 17 wherein said adjuvants are selected from the group consisting of viscosity modifiers, adhesion promoters, process and plasticizing oils, antioxidants, and pigments.

19. A method as claimed in claim 2 wherein said method includes applying said emulsions by a method selected from the group consisting of brushing, spraying, dip coating, and casting.

20. A method as claimed in claim 2 wherein said interpenetrating network polymer has a thickness in the range of 2 to 1000 micrometers.

21. The method as claimed in claim 2 wherein said interpenetrating network is a cured product of a crosslink reaction of silanols to yield siloxane crosslinking.

22. The method as claimed in claim 20 wherein said resulting interpenetrating network polymer is a coating.

23. The method as claimed in claim 22 wherein said coating is selected from the group consisting of architectural coatings, protective coating, semi-permeable coatings, and stain resistant coatings.

* * * * *